US010908306B2

(12) United States Patent
Nams et al.

(10) Patent No.: US 10,908,306 B2
(45) Date of Patent: Feb. 2, 2021

(54) UNDERWATER ACOUSTIC SOURCE AND ACTUATOR

(71) Applicant: GeoSpectrum Technologies Inc., Dartmouth (CA)

(72) Inventors: Dainis Nams, Halifax (CA); Janis Nams, Tatamagouche (CA); Robert Jefferson, Forest Hills (CA); Bruce A. Armstrong, Dartmouth (CA)

(73) Assignee: GEOSPECTRUM TECHNOLOGIES INC., Dartmouth (CA)

( * ) Notice: Subject to any disclaimer, the term of this patent is extended or adjusted under 35 U.S.C. 154(b) by 323 days.

(21) Appl. No.: 15/976,088

(22) Filed: May 10, 2018

(65) Prior Publication Data
US 2019/0346578 A1 Nov. 14, 2019

(51) Int. Cl.
*G01V 1/02* (2006.01)
*G01V 1/38* (2006.01)

(52) U.S. Cl.
CPC .............. *G01V 1/159* (2013.01); *G01V 1/38* (2013.01)

(58) Field of Classification Search
CPC .................................. G01V 1/159; G01V 1/38
See application file for complete search history.

(56) References Cited

U.S. PATENT DOCUMENTS

| 5,673,326 | A | * | 9/1997 | Goldfarb | ................. | H04R 3/14 |
| | | | | | | 381/28 |
| 2013/0100778 | A1 | | 4/2013 | Ruet et al. | | |
| 2019/0346578 | A1 | * | 11/2019 | Nams | ...................... | G01V 1/38 |

FOREIGN PATENT DOCUMENTS

WO WO-2019215543 A1 * 11/2019 ............. G01V 1/159

OTHER PUBLICATIONS

International Search Report of PCT Application No. PCT/IB2019/053564, dated Aug. 19, 2019.

* cited by examiner

*Primary Examiner* — Daniel Pihulic
(74) *Attorney, Agent, or Firm* — Pearl Cohen Zedek Latzer Baratz LLP

(57) ABSTRACT

An underwater acoustic source can include a first piston coupled to a second piston and a plurality of linear magnetic actuators directly connected to each of the first piston and the second piston. Each of the plurality of linear magnetic actuators include a linear shaft positioned within the cylindrical magnetic assembly and mounted to the first end of the rigid ferromagnetic housing and the second end of the rigid ferromagnetic housing, such that the linear shaft is stationary, and linear bearings positioned between the cylindrical magnet assembly and the linear shaft to allow the cylindrical magnet assembly to translate along the linear shaft relative to the cylindrical electrical coil, and wherein each of the plurality of linear magnetic actuators is activated, the first piston and the second piston oscillate towards and away from each other, causing acoustic waves to be generated in water.

8 Claims, 10 Drawing Sheets

UNDERWATER ACOUSTIC SOURCE AND ACTUATOR

FIELD OF THE INVENTION

The invention relates generally to acoustic sources used underwater. In particular, the invention relates to a low frequency acoustic source having multiple actuators.

BACKGROUND OF THE INVENTION

Currently underwater acoustic sources exist for a variety of applications. Underwater acoustic sources can emit sound over a variety of distances and frequencies. Underwater acoustic sources can include various driving mechanisms. The driving mechanisms can include piezoelectrics, hydraulics, electric rotary motors, pneumatics, magnetostrictives, and/or electro-magnetic linear motors.

Decreasing the frequency of an underwater acoustic source to operate at a low frequency can result in a decrease of power level, which in turn can decrease range of the source. Increasing a volume of oscillation of the acoustic source can restore the decreased power level. Increasing the volume of oscillation can require moving large volumes of water as during operation, which in turn can require that low frequency (e.g., 20-500 Hz resonance) underwater acoustic sources are physically large and heave (e.g., ~850 kilograms).

Current low frequency underwater acoustic sources can include having a large housing with one or more sealed pistons that oscillate, for example, driven by a linear magnetic motor to create pressure waves in the surrounding water. Current low frequency underwater sources can include a single motor, an integral motor built into the source, and/or a bearing chassis separate from the motor, which supports the motion of the piston(s).

One of the difficulties with current sources is difficulty to manufacture, as components of the source can become more difficult to manufacture as their size increases. For example, underwater acoustic sources having a magnetic driver (e.g., motor) can be difficult to produce in large dimensions due to, for example, the difficulty associated with creating large magnets. Another difficulty with magnetic drivers can be that high force is often achieved by stacking together many magnets and coils axially, leading to a long actuator (e.g., 16 inches long) thus, typically requiring a long housing. Another difficulty with the current sources can be the complexity of alignment needed between the separate motor and bearings. Another difficulty with current sources is the tendency to experience undesirable higher frequency (e.g., 200-2000 Hz) flexural resonances in the piston(s), resulting from a single point of applied force. Such flexural resonances may limit the frequency range to which the source can be effectively used.

Therefore, it can be desirable to provide a low frequency underwater acoustic source having a smaller size and a sufficient power level. It can also be desirable to provide a low frequency acoustic source that does not require separate motors and bearings to be aligned. It can also be desirable to provide a low frequency acoustic source that allows force to be applied to the piston(s) distributed across multiple locations.

SUMMARY OF THE INVENTION

Advantages of the invention can include a reduction in size of acoustic sources due to, for example, a side-by-side arrangement of multiple short actuators. The reduction of size can also allow for a reduction of weight (e.g., 250 to 400 kilograms). It is typically undesirable for underwater acoustic sources to float. To avoid floating, the weight of the source is typically greater than the volume of the source. Because the invention can allow a smaller size for the acoustic source, the weight of the acoustic source can also be reduced.

Advantages of the invention can include cost savings due to, for example, a smaller housing size, ease of manufacturing smaller components (e.g., the electrical coil, magnet and/or bearing assemblies), and/or elimination of some specialized equipment that can be necessary to produce other acoustic sources. For example, smaller magnets (e.g., 3 inches in diameter by 1 inch thick) can be easy to manufacture and can be bought "off-the-shelf."

Advantages of the invention can include increased reliability due to, for example, ease of testing and/or ease of replacing damaged parts. Instead of testing/replacing the entire acoustic source, each individual actuator can be tested/replaced, which can allow testing and fixing that is quick and/or cheap compared to testing/fixing the entire acoustic source and/or a large magnetic motors within acoustic sources.

Advantages of the invention can include flexibility via an ability to build acoustic sources with different functional characteristics (e.g., size, power output, frequency) using the same actuator in varying numbers.

Advantages of the invention can include the reduction in undesirable high frequency resonances of the piston(s), due to the motor force being distributed across multiple points.

Advantages of the invention can include an ability of the actuator to dissipate heat due to, for example, the fact that the electrical coil is positioned against the ferromagnetic housing.

Advantages of the invention can include an immediate load path to the ferromagnetic housing, due to, for example, the fact that the electrical coil is positioned against the ferromagnetic housing. This can allow high forces to be transmitted from the coil to the load without damaging the relatively weak coil. Advantages of the invention can include a structurally robust arrangement due to, for example, the bearing shaft being supported at both ends.

Advantages of the invention can include an ability of the actuators to function while experiencing significant side loads (e.g., side loads caused by magnetic attraction between the magnet shaft and steel housing).

Advantages of the invention can include a compact arrangement due to, for example, the linear bearings and the bearing shaft being located within the magnet shaft (e.g., as opposed to using external bearings), thus decreasing size.

In one aspect, the invention includes a linear magnetic actuator for an acoustic source. The linear magnetic actuator includes a rigid ferromagnetic housing having a first end and a second end, a cylindrical electrical coil mounted to an inside of the rigid ferromagnetic housing, and a cylindrical magnet assembly positioned adjacent to the cylindrical electrical coil. The cylindrical magnet assembly includes a magnet shaft having a center longitudinal axis, and a cylindrical magnet having a center longitudinal axis that is aligned with the center longitudinal axis of the magnet shaft, the at least one cylindrical magnet having an outer diameter that is smaller than an inner diameter of the cylindrical electric coil. The linear magnetic actuator includes a linear shaft positioned within the cylindrical magnetic assembly and mounted to the first end of the rigid ferromagnetic housing and the second end of the rigid ferromagnetic housing, such that the linear shaft is stationary relative to the rigid ferromagnetic housing and a linear bearing positioned between the cylindrical magnet assembly and the linear shaft to allow the cylindrical magnet assembly to translate along the linear shaft relative to the cylindrical electrical coil.

In some embodiments, the linear magnetic actuator of claim 1 wherein the magnet shaft length is shorter than the rigid ferromagnetic housing shaft. In some embodiments, the cylindrical magnet assembly includes at least one cylindrically shaped ferromagnet positioned adjacent to the at least one cylindrical magnet and at least one standoff rigidly fixed to the at least one cylindrically shaped ferromagnet and protruding through either the first end or the second end of linear magnetic actuator.

In some embodiments, the cylindrical magnet assembly includes a first cylindrical shaped ferromagnet positioned adjacent a first surface of the cylindrical magnet, a second cylindrical shaped ferromagnet positioned adjacent a second surface of the cylindrical magnet, a second cylindrical magnet having a first surface that is positioned adjacent the second cylindrical ferromagnet, and a third cylindrical shaped ferromagnet positioned adjacent a second surface of the second cylindrical magnet.

In some embodiments, the linear magnetic actuator includes electrical leads coupled to the cylindrical electrical coil to apply an oscillating current to the cylindrical electrical coil. In some embodiments, the rigid ferromagnetic housing has a cylindrical shape. In some embodiments, the diameter of the rigid ferromagnetic housing is between 3 and 5 inches.

In another aspect, the invention includes an underwater acoustic source. The acoustic source includes a first piston coupled to a second piston, and a plurality of linear magnetic actuators directly connected to each of the first piston and the second piston, such that when at least two of the plurality of linear magnetic actuators is activated, the first piston and the second piston oscillate towards and away from each other, causing acoustic waves to be generated in water.

In some embodiments, at least two of the plurality of linear magnetic actuators are electrically connected. In some embodiments, each of the first piston and the second piston is cylindrically shaped having a diameter between 12 and 40 inches. In some embodiments, each of the plurality of linear magnetic actuators is directly connected to each of the first piston and the second piston.

In some embodiments, the underwater acoustic source includes a resonant frequency between 20 and 500 Hertz. In some embodiments, at least two of the plurality of linear magnetic actuators has a diameter between 3 and 5 inches. In some embodiments, the underwater acoustic source of includes one or more springs directly coupled to the first piston and the second piston.

In another aspect, the invention includes an underwater acoustic source. The acoustic source includes a first piston coupled to a second piston and a plurality of linear magnetic actuators directly connected to each of the first piston and the second piston. Each of the plurality of linear magnetic actuators includes a rigid ferromagnetic housing, having a first end and a second end, a cylindrical electrical coil mounted to an inside of the rigid ferromagnetic housing such that the cylindrical electrical coil is stationary relative to the rigid ferromagnetic housing, and a cylindrical magnet assembly positioned adjacent to the cylindrical electrical coil. The cylindrical magnet assembly includes a magnet shaft having a center longitudinal axis, and at least one cylindrical magnet having a center longitudinal axis that is aligned with the center longitudinal axis of the magnet shaft, the at least one cylindrical magnet having an outer diameter that is smaller than an inner diameter of the cylindrical electric coil. Each of the plurality of linear magnetic actuators also include a linear shaft positioned within the cylindrical magnetic assembly and mounted to the first end of the rigid ferromagnetic housing and the second end of the rigid ferromagnetic housing, such that the linear shaft is stationary, and linear bearings positioned between the cylindrical magnet assembly and the linear shaft to allow the cylindrical magnet assembly to translate along the linear shaft relative to the cylindrical electrical coil, and wherein each of the plurality of linear magnetic actuators is activated, the first piston and the second piston oscillate towards and away from each other, causing acoustic waves to be generated in water.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION OF THE INVENTION

Figure 1:
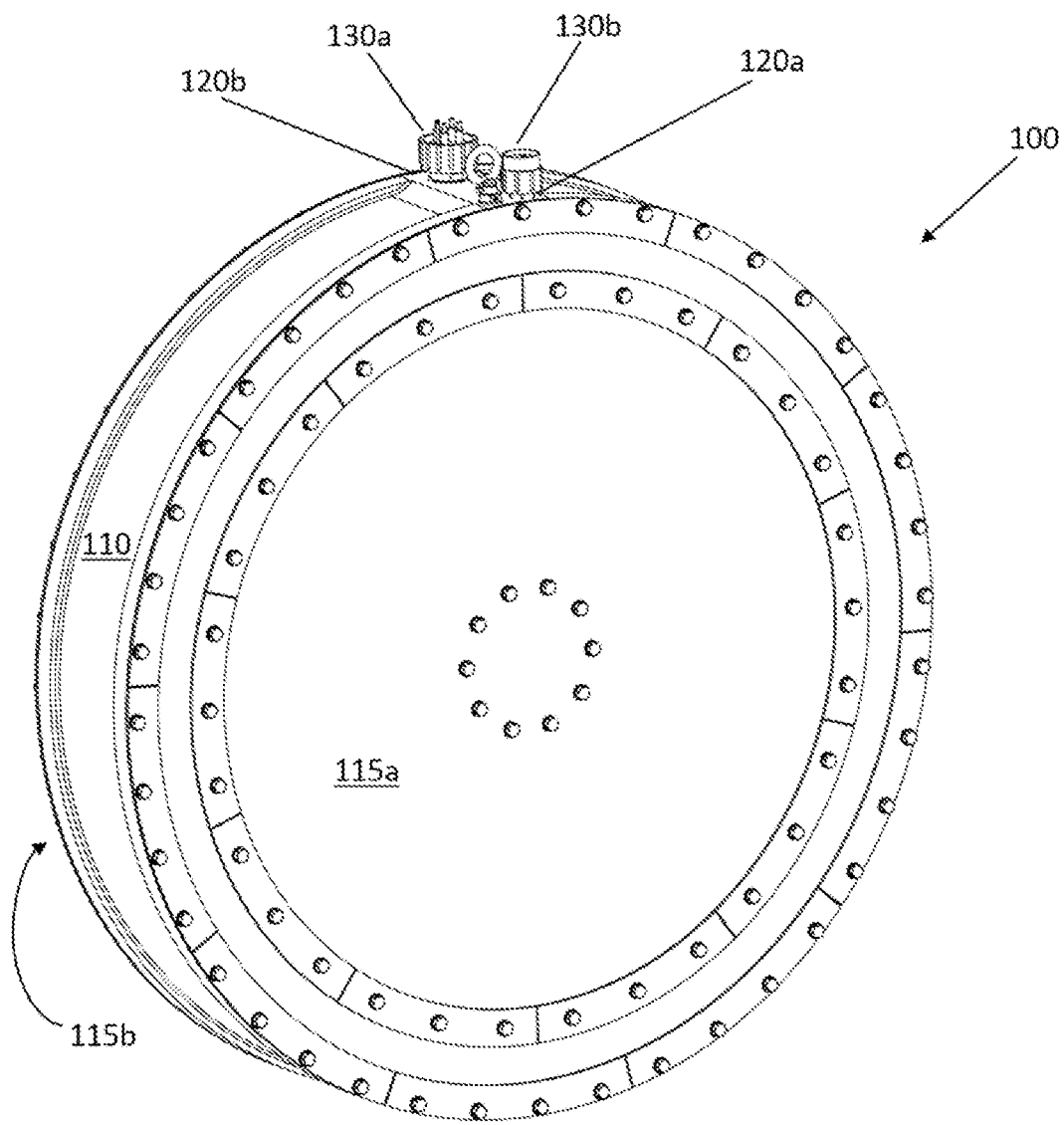
FIG. 1 is a diagram showing an example of a low frequency underwater acoustic source, according to an illustrative embodiment of the invention.

FIG. 1 is a diagram showing an example of a low frequency (e.g., 20-500 Hertz resonance) underwater acoustic source 100, according to an illustrative embodiment of the invention. The underwater acoustic source 100 has a housing 110 that is coupled to two pistons 115a and 115b.

The housing 110 includes two electrical entry ports 120a and 120b. The electrical entry ports 120a and 120b can allow power to be supplied to the underwater acoustic source 100. The electric entry ports 120a and 120b can have respective underwater electrical connectors 130a and 130b inserted therein. The electrical connectors 130a and 130b can be coupled to a power source (not shown). The power source can be a current source. The current supplied by the power source can depend on a desired acoustic source output, the desired range for the acoustic source output. For example, for a desired acoustic source output of 95 dB, the current source can provide 50 amps RMS current. In various embodiments, the current source supplies up to 70 amps RMS AC current.

In some embodiments, there is only one electrical entry port. In various embodiments, there are n electrical entry ports, where n is an integer value. In some embodiments, the electrical entry ports 120a and 120b are positioned on the piston 115a and/or on the piston 115b.

The housing 110 and the two pistons 115a and 115b form a cylindrical shape. In some embodiments the housing 110 and the two pistons 115a and 115b form a cube. In some embodiments, the housing 100 and the two pistons 115a and 115b form an ellipsoid. In various embodiments, the housing 110 and/or the two pistons 115a and 115b are aluminum, stainless steel, steel and/or titanium.

Figure 2A:
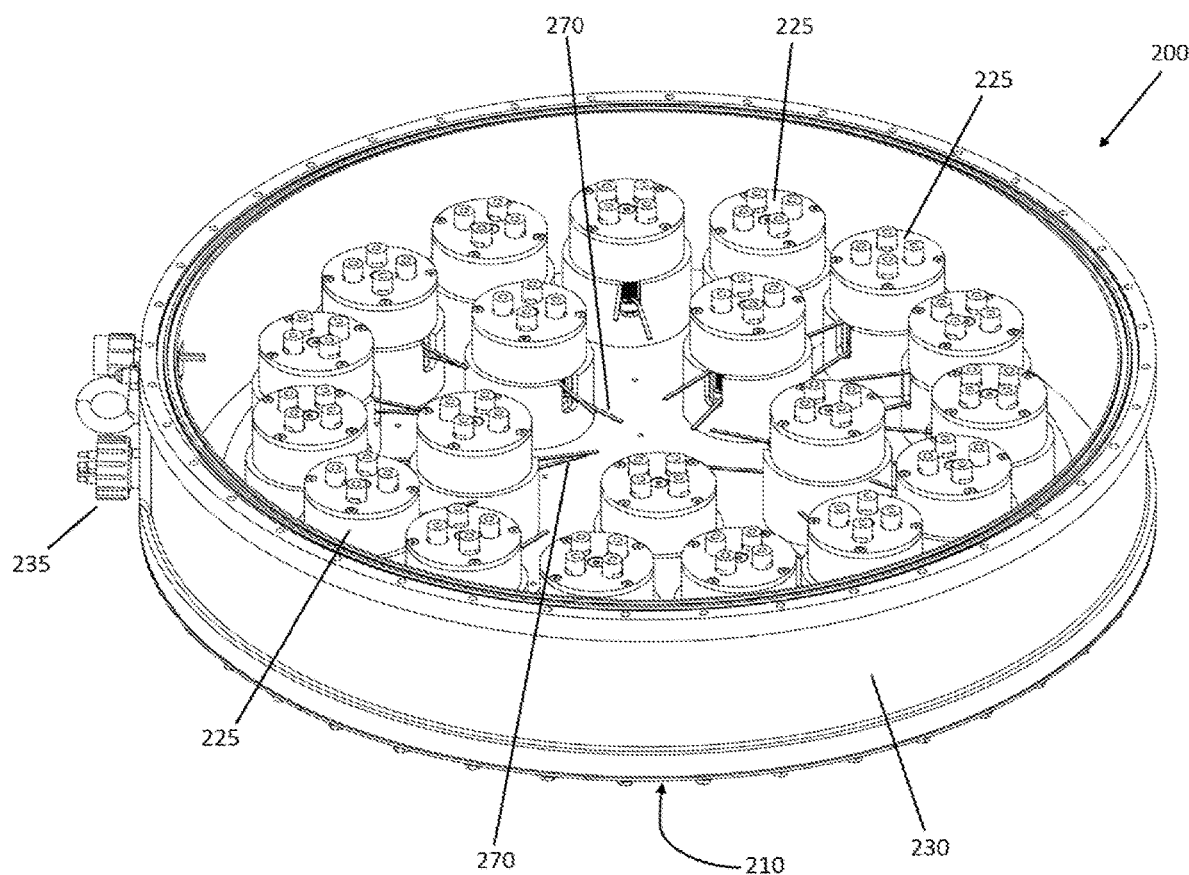
FIG. 2A is a three-dimensional diagram of a low frequency underwater acoustic source with one piston removed, according to an illustrative embodiment of the invention.
Figure 2B:
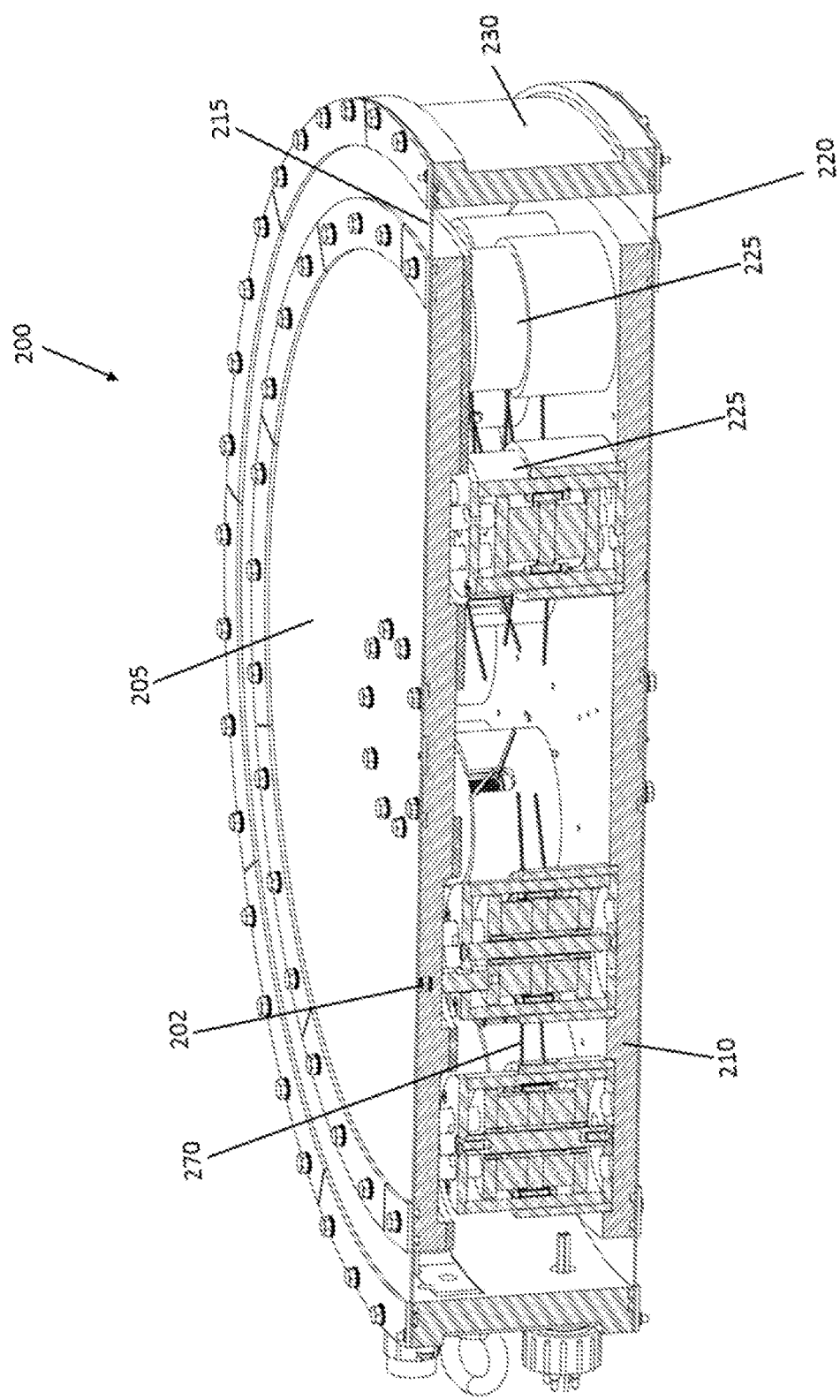
FIG. 2B is a three-dimensional diagram of a cross-section of the low frequency underwater acoustic source of FIG. 2B, according to an illustrative embodiment of the invention.
Figure 2C:
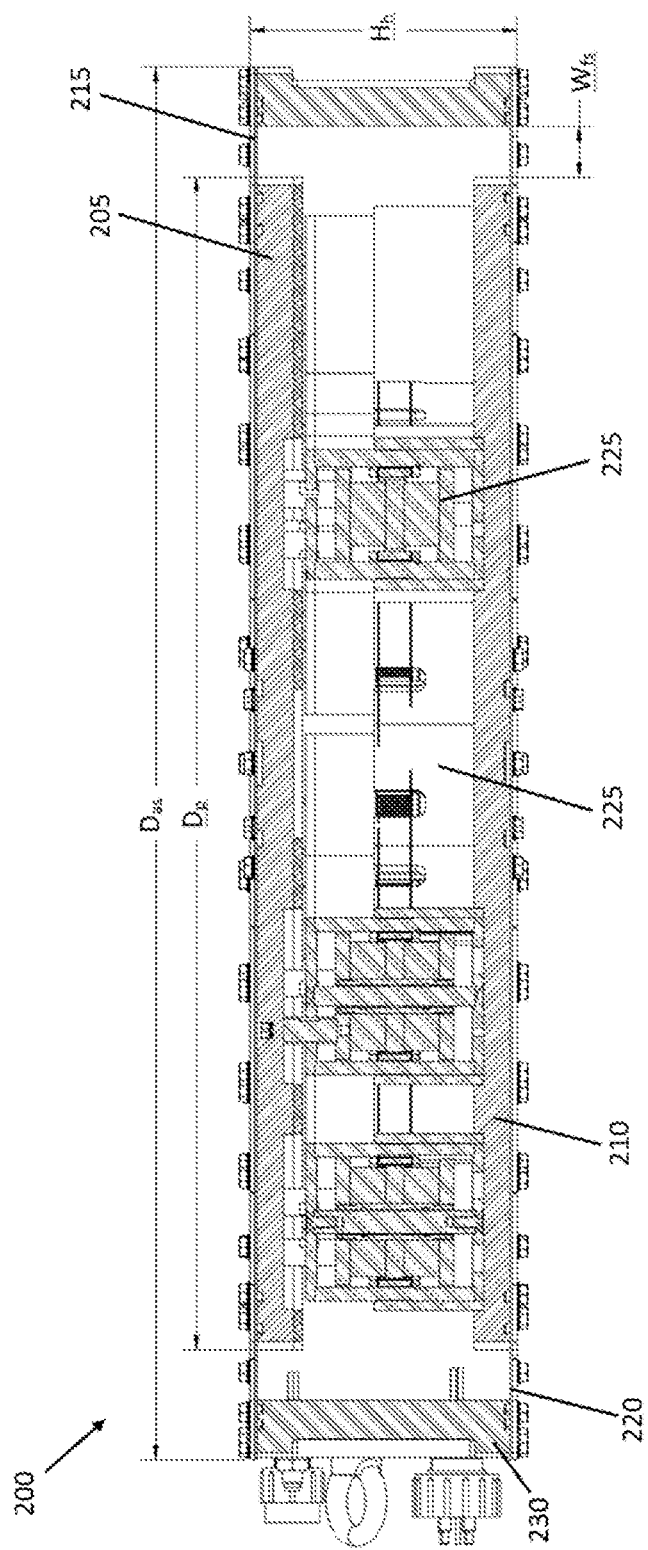
FIG. 2C is a two-dimensional schematic diagram of the cross-section of the low frequency underwater acoustic source of FIG. 2C, according to an illustrative embodiment of the invention.

FIG. 2A is a three-dimensional diagram of a low frequency underwater acoustic 200 source with end removed, FIG. 2B is a three-dimensional diagram of a cross-section of the low frequency underwater acoustic source 200 of FIG. 2A, and FIG. 2C is a two-dimensional schematic diagram of the cross-section of the low frequency underwater acoustic source 200 of FIG. 2A, according to illustrative embodiments of the invention. Viewing FIGS. 2A, 2B and 2C together, the low frequency acoustic source 200 includes a first piston 205, a second piston 210, a first flexible seal 215, a second flexible seal 220, a plurality of actuators 225, a housing 230, and an electrical connector 235.

The first piston 205 can be coupled to the housing 230 via the first flexible seal 215. The second piston 210 can be coupled to the housing 230 the second flexible seal 220. The first piston 205 and the second piston 210 can be coupled to the housing 230 such that they form a cylindrical shape.

The first piston 205 and/or the second piston 210 can have a diameter $D_p$ that depends on the number of actuators in the plurality of actuators 225.

The first piston 205 and/or the second piston 210 can have a diameter $D_p$ that is 32 inches. In various embodiments, the first piston 205 and/or the second piston 210 have a diameter $D_p$ between 8 and 40 inches. The first flexible seal 215 and/or the second flexible seal 220 can have a width $W_{fs}$ that is 1.6 inches wide along the circumference of the acoustic source 200. In various embodiments, the first flexible seal 215 and/or the second flexible seal 220 can have a width $W_{fs}$ that is between 0.4 and 3 inches along the circumference of the acoustic source 200.

The housing 230 can have a height $H_h$ that is dependent upon a height of the plurality of actuators 225. In various embodiments, the housing 230 has a height $H_h$ between 3 and 10 inches.

In some embodiments, the acoustic source 200 has a diameter $D_{as}$ of 38 inches and a height $H_{as}$ of 7.3 inches. In various embodiments, the acoustic source 200 has a diameter $D_{as}$ between 8 and 46 inches and/or a height $H_{as}$ between 4 and 13 inches. In some embodiments, the diameter $D_{as}$ of the acoustic source 200 depends on the number of the plurality of actuators 225. In some embodiments, the height $H_{as}$ of the acoustic source 200 depends on a height of the plurality of actuators 225.

The first piston 205, the second piston 210 and/or the housing 220 can be aluminum, stainless steel, steel and/or titanium. The first flexible seal 215 and/or the second flexible seal 220 can be rubber, stainless steel, titanium and/or aluminum. In various embodiments, the first piston 205, the second piston 210, the housing 220, the first flexible seal 220 and/or the second flexible seal 220 are materials that are suitable for underwater submersion and/or sealing respectively, as is known in the art.

The plurality of actuators 22 can include n actuators, where n is an integer number. In some embodiments, there is only one actuator. In some embodiments, the number of the plurality of actuators 225 depends on the size of acoustic source 200. For example, the number of the plurality of actuators 225 can be a maximum number that can physically fit within the acoustic source 200. In some embodiments, a number for the plurality of actuators 225 is between 3 and 30.

The plurality of actuators 225 can each have a first end and a second end, for example, as described in further detail below, with respect to FIGS. 4A, 4B and 4C. A first end of each of the plurality of actuators 225 can be connected to the first piston 205 via one or more screws 202. A second end of the each of the plurality of actuators 225 can be connected to the second piston 210 via one or more screws (not shown). In various embodiments, the plurality of actuators can be connected to the first piston 205 and/or the second piston 210 via a bolt, pins, adhesive joints, and/or other mechanical fastening means as are known in the art.

The plurality of actuators 225 can be linear magnetic actuators as described below in FIGS. 4A, 4B and 4C. In various embodiments, the plurality of actuators 225 are linear magnetic actuators as are known in the art.

During operation, the acoustic source 200 receives power (e.g., electrical current) from a source (not shown) via the electrical connector 235. The electrical connector 235 supplies the received current to each of the plurality of actuators 225 via a set of respective electrical leads 270. The plurality of actuators 225 can be in series connection, a partial series connection, and/or any connection that can allow current to be supplied to all or a subset of the plurality of actuators 225.

Upon receiving the current, each of the plurality of actuators 225 is activated such that they cause the first piston 205 and the second piston 210 to move towards and away from each other (e.g., oscillate at a frequency, oscillate with a particular frequency and/or oscillate according to a complex waveform). The first flexible seal 215 and the second flexible seal 220 can allow the first piston 205 and the second piston 210 to move.

The first flexible seal 215 and the second flexile seal 220 can provide a spring force to the first piston 205 and the second piston 210. The spring force can allow the first piston 205 and the second piston 210 to center about a midpoint of a path of the oscillation of the pistons 205 and 210. The spring force can depend upon a desired resonance frequency of for the acoustic source 200. In some embodiments, the first flexible seal 215 and/or the second flexible seal 220 have a width $W_{fs}$ that is based on a desired resonance frequency of the acoustic source 200. For example, a 1.6 inch wide titanium hinge can be used to provide a 30 Hz resonance frequency.

In some embodiments, the acoustic source 200 has includes one or more springs to provide spring force. In various embodiments that include the one or more springs, the first flexible seal 215 and/or the second flexible seal 220 are also included in the acoustic source 200. In various embodiments that include the one or more springs, the first flexible seal 215 and/or the second flexible seal 220 are not included in the acoustic source 200. For example, acoustic source embodiments as are shown in FIGS. 3A, 3B and 3C.

Figure 3A:
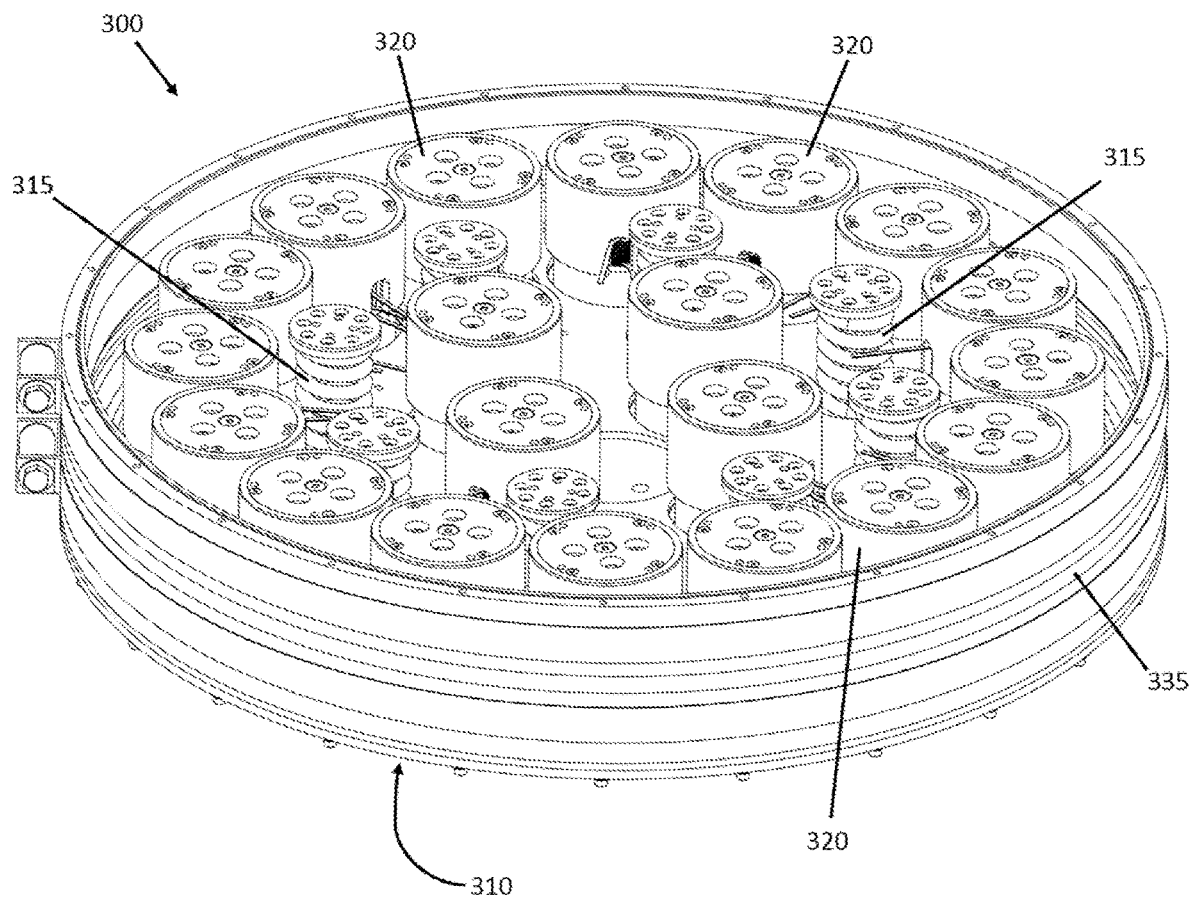
FIG. 3A is a three-dimensional diagram of a low frequency underwater acoustic source with one piston removed, according to an illustrative embodiment of the invention.
Figure 3B:
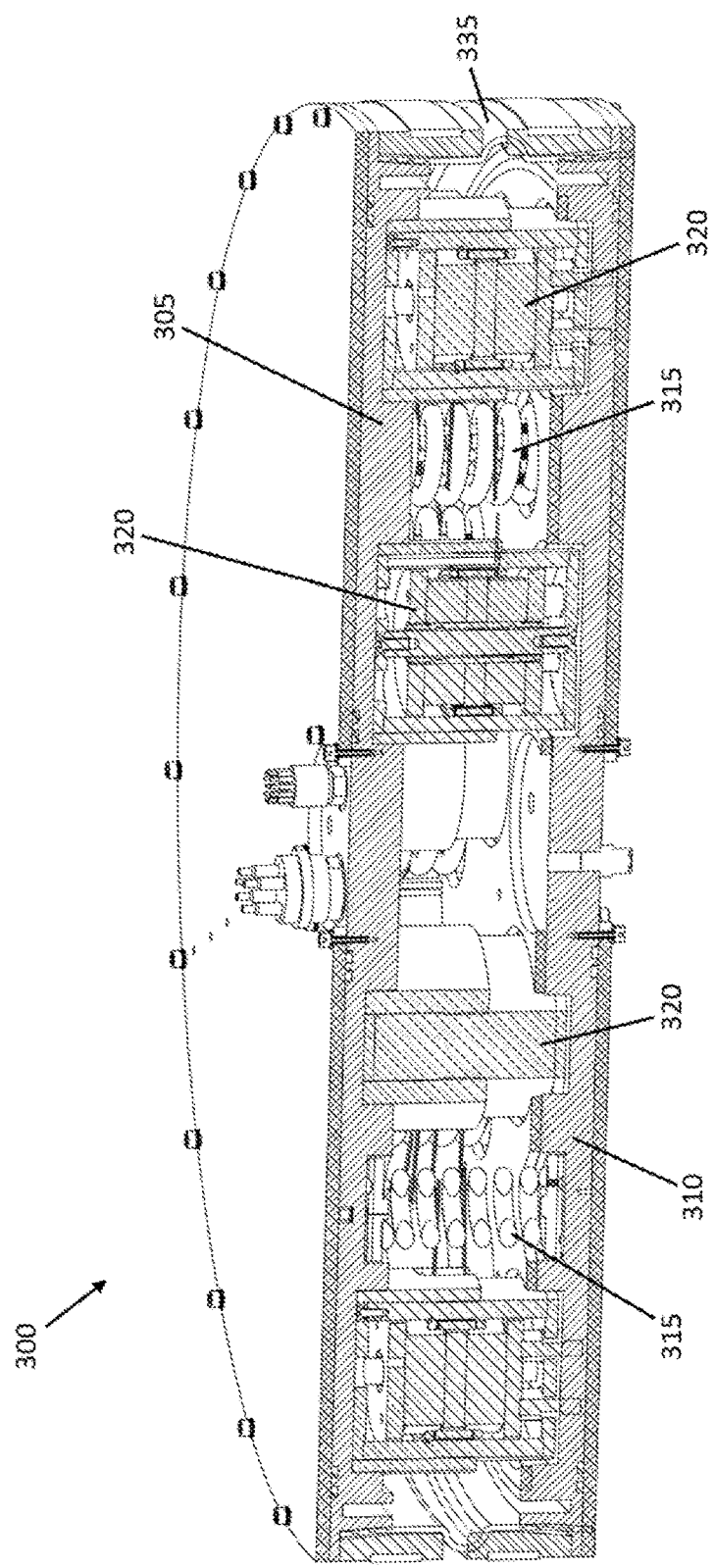
FIG. 3B is a three-dimensional diagram of a cross-section of the low frequency underwater acoustic source of FIG. 3A, according to an illustrative embodiment of the invention.
Figure 3C:
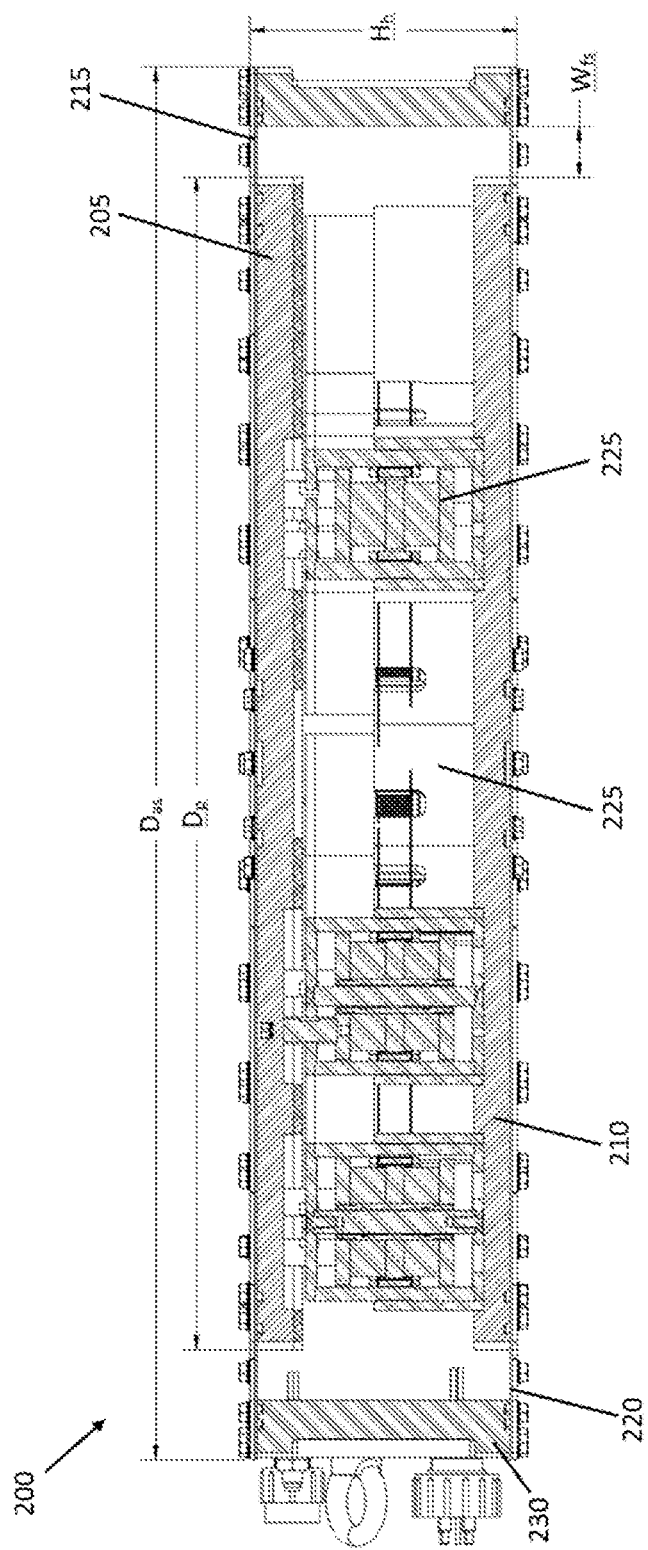
FIG. 3C is a two-dimensional schematic diagram of the cross-section of the low frequency underwater acoustic source of FIG. 3A, according to an illustrative embodiment of the invention.

FIG. 3A is a three-dimensional diagram of a low frequency underwater acoustic source 300 with one piston removed, FIG. 3B is a three-dimensional diagram of a cross-section of the low frequency underwater acoustic source 300 of FIG. 3A, and FIG. 3C is a two-dimensional schematic diagram of the cross-section of the low frequency underwater acoustic source 300 of FIG. 3A, according to illustrative embodiments of the invention.

Viewing FIGS. 3A, 3B and 3C together, the low frequency acoustic source 300 includes a first piston 305, a second piston 310, a plurality of springs (e.g., coils) 315, a plurality of actuators 320, a flexible seal 335, and an electrical connector 337.

The first piston 305 can be coupled to the plurality of actuators 320 and the plurality of coils 315. The second piston 310 can be coupled to the plurality of actuators 320, and the plurality of coils 315. The first piston 305 can be coupled to the second piston 310 via the flexible seal 335. The first piston 305 can be coupled to the second piston 310 such that they form a cylindrical shape.

The first piston 305 can have a height $H_{FP}$ and/or the second piston 310 can have a height $H_{SP}$ that is dependent upon a height of the plurality of actuators 320. The first piston 305 can have a height $H_{FP}$ that is equal (or substantially equal) to a height $H_{SP}$ of the second piston 310. In various embodiments, the first piston 305 and/or the second piston 310 have heights, $H_{FP}$ and $H_{SP}$, respectively, that are between 1.5 and 4 inches.

The distance d between the first piston 305 and the second piston 310 can be based on a size of the flexible hinge 340, a desired range of motion for oscillation between the first piston 305 and the second piston 310, the heights $H_{FP}$ and $H_{SP}$ of the first piston 305 and the second piston 310, respectively, a height of the plurality of actuators 320 and/or a height of the plurality of coils 315. In some embodiments, the height of the plurality of actuators 320 and the height of the plurality of coils 315 is equal (or substantially equal).

The distance d between the first housing 325 and the second housing 330 can be based on a size of the first flexible hinge 340, a size of the second flexible hinge 345, a desired range of motion for oscillation between the first piston 305 and the second piston 310, the heights $H_{FH}$ and $H_{SH}$ of the first housing 325 and the second housing 330, respectively, a height of the plurality of actuators 320 and/or a height of the plurality of coils 315. In some embodiments, the height of the plurality of actuators 320 and the height of the plurality of coils 315 is equal (or substantially equal).

The acoustic source 300, the first piston 305 and/or the second piston 320 can have dimensions and/or materials as described above with respect to FIGS. 2A, 2B and 2C.

The first flexible seal 335 can be rubber and/or any elastomers as is known in the art. The plurality of coils 315 can be spring steel and/or any metal with elasticity and stiffness that is sufficient to be a spring having a specified force, as is known in the art.

The plurality of actuators 320 can each have a first end and a second end, for example, as described in further detail below, with respect to FIGS. 4A, 4B and 4C. A first end of each of the plurality of actuators 320 can be connected to the first piston 305 via a respective screw 350 (and/or a plurality of screws, bolts, pins, adhesive joints, or other mechanical fastening means). A second end of the each of the plurality of actuators 320 can be connected to the second piston 310 via a respective bolt 360 (or a plurality of bolts screws, pins, adhesive joints, or other mechanical fastening means).

The plurality of coils 315 can each have a first end and a second end. A first end of each of the plurality of coils 315 can be connected to the first piston 305 via screws, bolts, pins, adhesive joints and/or other mechanical fastening means. A second end of the each of the plurality of coils 315 can be connected to the second piston 310 via screws, bolts, pins, adhesive joints and/or other mechanical fastening means.

During operation, the acoustic source 300 receives power (e.g., electrical current) from a power source (not shown) via the electrical connector 337. The electrical connector 337 supplies the received power to each of the plurality of actuators 320 via a series connection between each of the plurality of actuators 320, a partial series connection between each of the plurality of actuators, and/or any connection that can allow current to be supplied to all or a subset of the plurality of actuators 320.

Upon receiving the current, each of the plurality of actuators 320 is activated such that they cause the first piston 305 and the second piston 310 to move towards and away from each other (e.g., oscillate at a frequency, oscillate with a particular frequency and/or oscillate according to a complex waveform). The first flexible hinge 340 and the second flexible hinge 345 can allow the first piston 205 and the second piston 210 to move.

The plurality of coils 315 can provide a spring force to the first piston 305 and the second piston 310. The spring force can allow the first piston 305 and the second piston 310 to center about a midpoint of a path of the oscillation. The plurality of coils 315 can be biased such that pressure exerted onto the pistons 305 and 310 by water when the acoustic source 300 is submerged into water is counteracted with the spring force. In this manner, the acoustic source 300 can have underwater pressure compensation without having an internal pressure compensation component. In some embodiments, the plurality of coils 315 have a spring force that is based on a desired resonance frequency of the acoustic source 300. For example, the plurality of coils 315 can have a spring constant totaling 10,500 lb/in to achieve a resonant frequency of 30 Hertz.

The acoustic sources 200 and 300 can produce an acoustic wave having an oscillation frequency between 20 and 500 Hertz. In various embodiments, the first piston and/or the second piston in acoustic sources 200 and/or 300 dissipate heat generated therein.

Figure 4A:
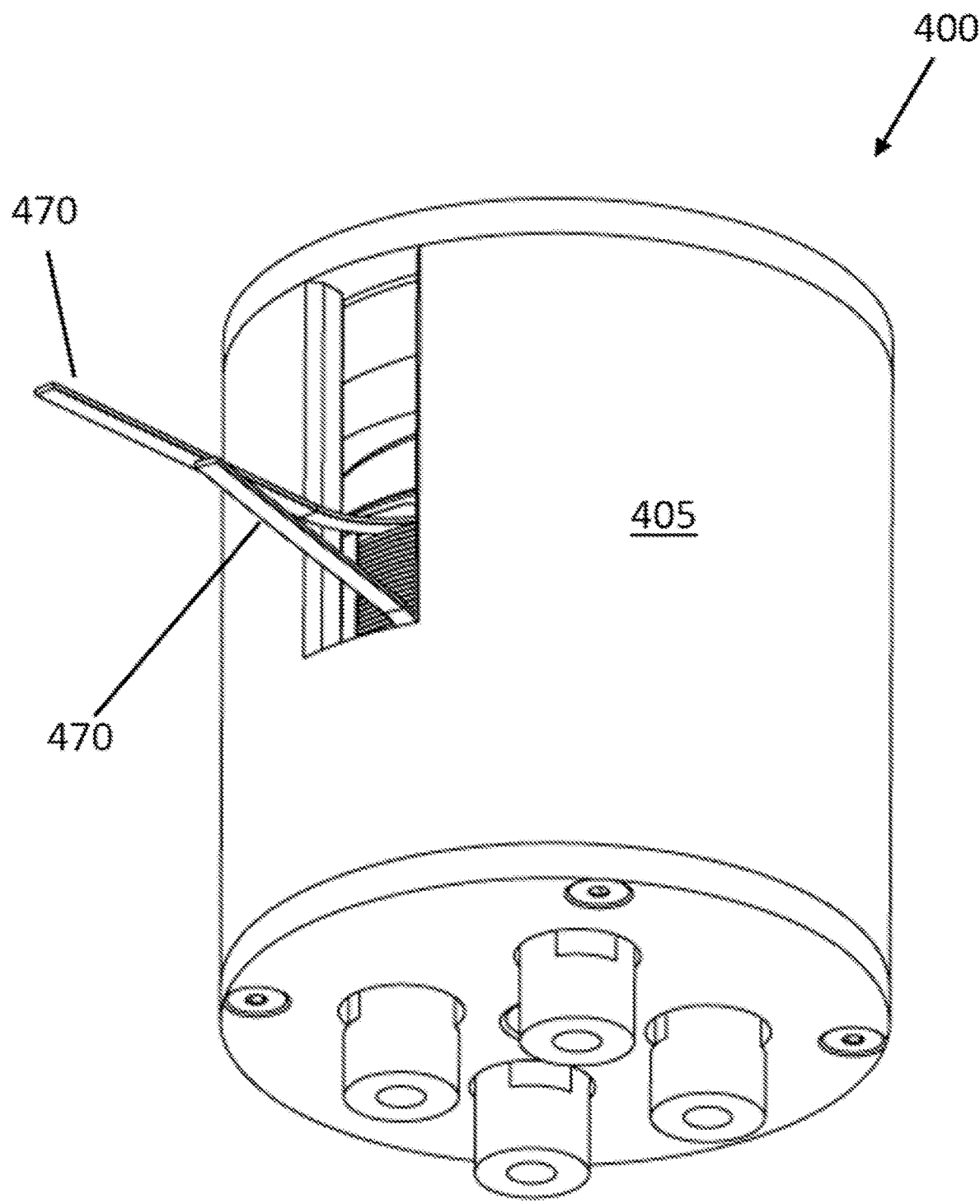
FIG. 4A is a three-dimensional diagram of a linear magnetic actuator for an acoustic source, according to an illustrative embodiment of the invention.
Figure 4B:
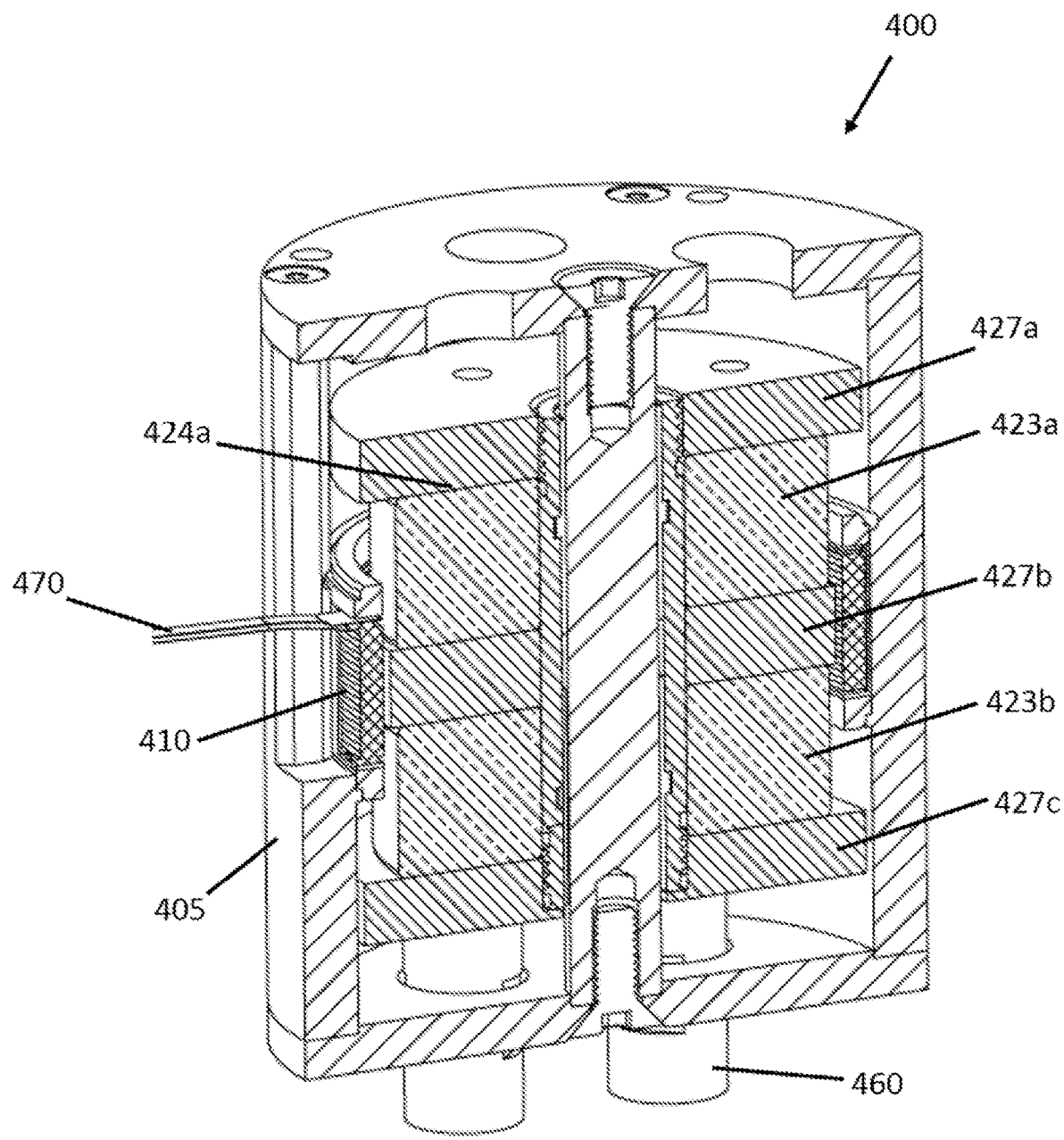
FIG. 4B is a three-dimensional diagram of a cross-section of the linear magnetic actuator of FIG. 4A, according to an illustrative embodiment of the invention.
Figure 4C:
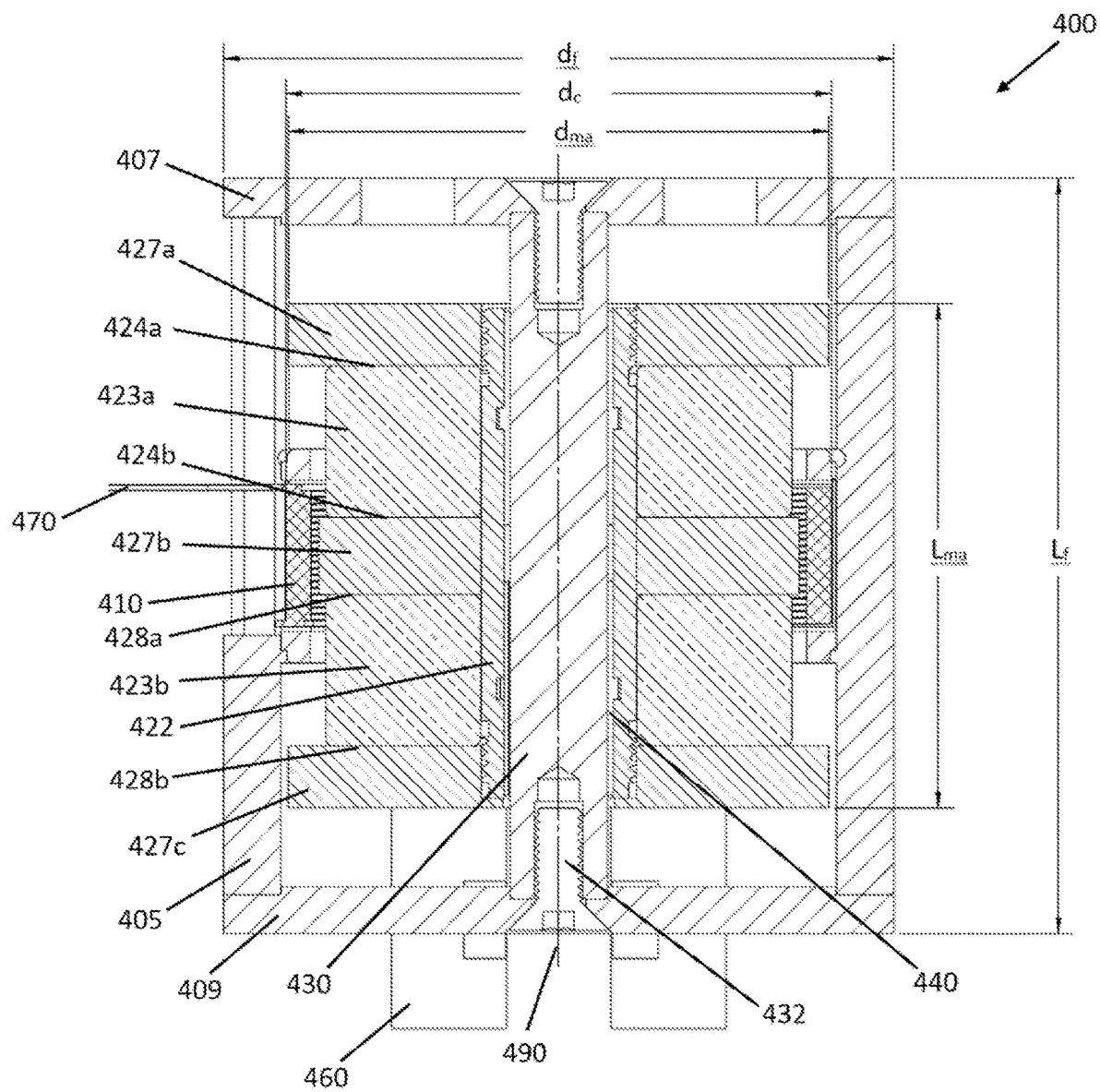
FIG. 4C is a two-dimensional schematic diagram of the cross-section of the linear magnetic actuator of FIG. 4B, according to an illustrative embodiment of the invention.

FIG. 4a is a three-dimensional diagram of a linear magnetic actuator 400 for an acoustic source (e.g., acoustic source of FIG. 2a, as described above), FIG. 4b is a three-dimensional diagram of a cross-section of the linear magnetic actuator 400 of FIG. 4a, and FIG. 4C is a two-dimensional schematic diagram of the cross-section of the linear magnetic actuator 400 of FIG. 4a, according to illustrative embodiments of the invention.

The linear magnetic actuator 400 includes a rigid ferromagnetic housing 405, a cylindrical electrical coil 410, a cylindrical magnet assembly 420, a linear shaft 430, linear bearings 440, a plurality of ferromagnetic returns 450, a plurality of standoffs 460 and electrical leads 470.

The rigid ferromagnetic housing 405 has a first end 407 and a second end 409. The rigid ferromagnetic housing 405 can be cylindrically shaped. The rigid ferromagnetic housing 405 can have a diameter $d_f$ between 3 and 5 inches. The rigid ferromagnetic housing 405 can have a length $L_f$ between 2.5 and 8 inches. The rigid ferromagnetic housing 405 can have a diameter d of 4.3 inches and a length $L_f$ of 3.9 inches. The rigid ferromagnetic housing 405 can be 1018 steel. In various embodiments, the rigid ferromagnetic housing 405 is iron, steel, silicon steel, laminated steel (e.g., silicon) and/or nickel alloys.

The linear shaft 430 is connected to the first end 407 and the second end 409 of the rigid ferromagnetic housing 405 via screws 432. In some embodiments, the linear shaft 430 is connected to the rigid ferromagnetic housing 405 via adhesives, crimps, pins and/or press-fitting. The linear shaft 430 can be centered about a longitudinal axis 490 (e.g., centered longitudinal axis). The center longitudinal axis 490 can extend along a center axis of the linear shaft 430 in the longitudinal direction. The linear shaft 430 can be steel, stainless steel, aluminum, or any combination thereof. The linear shaft 430 can have a diameter that depends on the type of bearing used and length of the ferromagnetic housing. In some embodiments, the linear shaft has a diameter of 0.5 inches. In some embodiments, the linear shaft has a diameter of 0.3-0.75 inches. The linear shaft 430 can have a length that depends upon the length of the ferromagnetic housing 405.

The linear bearing 440 is positioned adjacent to the linear shaft 430. The linear bearing 440 is centered about the longitudinal axis 490. The linear bearing 440 can be a plastic sleeve bearing, a copper alloy sleeve bearing, or a recirculating ball bearing.

The cylindrical electrical coil 410 is coupled to the rigid ferromagnetic housing 405. In some embodiments, the cylindrical electrical coil 410 is mounted to the rigid ferromagnetic housing 405 via an adhesive compound. The cylindrical electrical coil 410 can have a diameter $d_c$ that is dependent upon the diameter $d_f$ of the ferromagnetic housing 405. The cylindrical electrical coil 410 can have an inner diameter of 3.2 inches. In various embodiments, the cylindrical electrical coil 410 can be made of copper and/or aluminum wire.

The cylindrical magnet assembly 420 is positioned adjacent to the cylindrical electrical coil 410. The cylindrical magnet assembly 420 includes a shaft 422 (e.g., a magnet shaft), a first cylindrical magnet 423a, a second cylindrical magnet 423b, a first cylindrical ferromagnet 427a, a second cylindrical ferromagnet 427b, and a third cylindrical ferromagnet 427c. The cylindrical magnet assembly 420 can have a diameter $d_{ma}$ that depends on the required force output and/or motor diameter. The cylindrical magnet assembly 420 can have a length $L_{ma}$ that depends upon a desired travel distance for the linear magnetic actuator 400. The cylindrical magnet assembly 420 can have an outer diameter $d_{ma}$ of 3 inches and a length $L_{ma}$ of 3.25 inches.

The first cylindrical ferromagnet 427a is positioned adjacent a first surface 424a of the first cylindrical magnet 423a.

The second cylindrical ferromagnet 427b is positioned adjacent a second surface 424b of the first cylindrical magnet 423a. The second cylindrical magnet 423b is positioned adjacent the second cylindrical ferromagnet 427b at a first surface 428a of the second cylindrical magnet 423b. The third ferromagnet 427c is positioned adjacent a second surface 428b of the second cylindrical magnet 423b.

The magnet shaft 422 is centered about a longitudinal axis that is aligned with the center longitudinal axis 490 of the linear shaft 430. The magnet shaft 422 can have a length that is shorter than the length of the ferromagnetic housing 405. The difference between the magnet shaft 422 length and the ferromagnetic housing 405 length can depend upon a desired maximum linear travel distance of the linear magnetic actuator 400. The desired maximum linear travel distance can depend upon an application for the linear magnetic actuator 400 (e.g., actuators for a source with a lower resonance such as 20 Hz, can require several times more travel then actuators for a source with a higher resonance such as 200 Hz). In various embodiments, the ratio between the magnet shaft 422 length and the ferromagnetic housing 405 length is between 0.75 and 0.87.

The first cylindrical magnet 423a, the second cylindrical magnet 423b, the first cylindrical ferromagnet 427a, the second cylindrical ferromagnet 427b and/or the third cylindrical ferromagnet 427c can be centered about a longitudinal axis that is aligned with the center longitudinal axis 490.

The first cylindrical magnet 423a can have an outer diameter of 3 inches. The second cylindrical magnet 423b can have an outer diameter of 3 inches. The first cylindrical magnet 423a and the second cylindrical magnet 423b can have inner and/or outer diameters that are equal (or substantially equal). The first cylindrical magnet 423a and the second cylindrical magnet 423b can have inner and/or outer diameters that are different. The first cylindrical magnet 423a and the second cylindrical magnet 423b can be axially poled with similar poles facing each other (e.g., south facing south or north facing north, respectively). The first cylindrical magnet 423a and/or the second cylindrical magnet 423b can be neodymium alloy.

The first cylindrical ferromagnet 427a, the second cylindrical ferromagnet 427b and/or the third cylindrical ferromagnet 427c can be 1018 steel. In various embodiments, first cylindrical ferromagnet 427a, the second cylindrical ferromagnet 427b and/or the third cylindrical ferromagnet 427c is iron, steel, silicon steel, laminated steel (e.g., silicon) and/or nickel alloys.

The first cylindrical ferromagnet 427a and the third cylindrical ferromagnet can have a diameter that is bigger than the diameter of the second cylindrical ferromagnet 427b (e.g., the first and third cylindrical ferromagnet, 427a and 427c, can have a diameter of 3.48 inches and the second cylindrical ferromagnet 427b can have a diameter of 3.09 inches). The second cylindrical ferromagnet 427b can have a diameter that is equal (or substantially equal to) the first cylindrical magnet 423a and/or the second cylindrical magnet 423b.

In some embodiments, the cylindrical magnet assembly 420 includes only the first cylindrical magnet 423a. In some embodiments, the cylindrical magnet assembly 420 includes only the first cylindrical magnet 423a and the second cylindrical magnet 423b. In some embodiments, the cylindrical magnet assembly 420 includes only the first cylindrical ferromagnet 427a. In some embodiments, the cylindrical magnet assembly 420 includes only the first cylindrical ferromagnet 427a and the second cylindrical ferromagnet 427b. In various embodiments, the cylindrical magnet assembly 420 includes n cylindrical ferromagnets, where n is an integer value. In some embodiments, the cylindrical magnet assembly 420 includes n cylindrical magnets, where n is an integer value.

The cylindrical magnet assembly 420 can include a plurality of standoffs 460 connected to the third cylindrical ferromagnet 427c and extending through respective holes in the second end 407 of the ferromagnetic housing 405. As is apparent to one of ordinary skill in the art, in embodiments where there are more or less ferromagnets and/or magnets, the plurality of standoffs is coupled to the cylindrical magnet assembly 420 via any available component. In some embodiments, there are n standoffs in the plurality of standoffs, where n is an integer number.

The ferromagnetic housing 405 can include an aperture 465 (e.g., a slot) for one or more electrical leads 470 that are connected to the cylindrical electrical coil 410 to exit the ferromagnetic housing 405.

In various embodiments, the rigid ferromagnetic housing 405 is square or rectangular shaped. In these embodiments, the magnets, the coil, and the ferromagnets are square or rectangular shaped, respectively.

During operation, the first cylindrical magnet 423a and the second cylindrical magnet 423b can generate a magnetic field (e.g., between 1 and 2 Tesla). The magnetic field can be directed in a loop by the first, second and third ferromagnets, 427a, 427b, and 42c, respectively. The magnetic field can also pass through the electrical coil 410. Current (e.g., an AC current) can be applied to the electrical coil 410 (e.g., via electrical leads 470). The current can be 0-70 amps RMS AC current. Applying current to the electrical coil 410 can cause a force to be generated due to, for example, a right angle interaction of the current passing through the electrical coil 410 and the magnetic field generated by the first and second cylindrical magnets 423a and 423b, respectively. The force can cause the electrical coil 410 that is mounted to the ferromagnetic housing 405 and the first and second cylindrical magnets 423a and 423b, respectively, (and thus the cylindrical magnet assembly 420) to move axially (e.g., translate), relative to one another along the axis 490 via the linear bearing 440. The direction of the translation can cause the cylindrical magnet assembly 420 to be positioned more towards the first end 407 of the ferromagnetic housing 405 or to be positioned more towards the second end 409 of the ferromagnetic housing 405. The direction of the force can be depending upon the direction of the AC current at any given time. In this manner, an AC current can be applied to cause the cylindrical magnet assembly 420 to move back and forth relative the ferromagnetic housing 405 along the axis 490.

The linear magnetic actuator 400 can be used in acoustic source 200 and/or acoustic source 300, as described above with respect to FIGS. 2A, 2B, 2C, and FIGS. 3A, 3B and 3C, respectively. For example, in both acoustic sources 200 and 300, the plurality of actuators can each be the linear magnetic actuator 400. The first end of each of the ferromagnetic housings can be coupled to the first piston, and the plurality of shaft standoffs for each linear magnetic actuator can be coupled to the second piston. Each of the plurality of actuators can receive the same AC current, such that each of the plurality of actuators translate in the same direction in unison (or substantially in unison). When each of the plurality of actuators has its respectively cylindrical magnet assembly translate, the first piston and the second piston move with the same frequency as the cylindrical magnet assemblies oscillate. In this manner, the plurality of actuators can cause the acoustic source to oscillate without the acoustic source having its own bearing structure. In some embodiments, the absence of a bearing structure within the acoustic source can provide a simplicity in the construction of the acoustic source, a reduction in the weight of the acoustic source, and/or an ability to easily replace defective actuators without having to replace the entire source.

In some embodiments, actuators can be added and/or removed from the acoustic source, depending upon a desired number of actuators.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A linear magnetic actuator for an acoustic source comprising:
   a rigid ferromagnetic housing having a first end and a second end;
   a cylindrical electrical coil mounted to an inside of the rigid ferromagnetic housing;
   a cylindrical magnet assembly positioned adjacent to the cylindrical electrical coil, the cylindrical magnet assembly comprising:
      a magnet shaft having a center longitudinal axis, and
      a cylindrical magnet having a center longitudinal axis that is aligned with the center longitudinal axis of the magnet shaft, the at least one cylindrical magnet having an outer diameter that is smaller than an inner diameter of the cylindrical electric coil;
   a linear shaft positioned within the cylindrical magnetic assembly and mounted to the first end of the rigid ferromagnetic housing and the second end of the rigid ferromagnetic housing, such that the linear shaft is stationary relative to the rigid ferromagnetic housing; and
   a linear bearing positioned between the cylindrical magnet assembly and the linear shaft to allow the cylindrical magnet assembly to translate along the linear shaft relative to the cylindrical electrical coil.

2. The linear magnetic actuator of claim 1 wherein the magnet shaft length is shorter than the rigid ferromagnetic housing shaft.

3. The linear magnetic actuator of claim 1 wherein the cylindrical magnet assembly further comprises:
   at least one cylindrically shaped ferromagnet positioned adjacent to the at least one cylindrical magnet; and
   at least one standoff rigidly fixed to the at least one cylindrically shaped ferromagnet and protruding through either the first end or the second end of linear magnetic actuator.

4. The linear magnetic actuator of claim 1 wherein the cylindrical magnet assembly comprises:
   a first cylindrical shaped ferromagnet positioned adjacent a first surface of the cylindrical magnet;
   a second cylindrical shaped ferromagnet positioned adjacent a second surface of the cylindrical magnet;
   a second cylindrical magnet having a first surface that is positioned adjacent the second cylindrical ferromagnet; and
   a third cylindrical shaped ferromagnet positioned adjacent a second surface of the second cylindrical magnet.

5. The linear magnetic actuator of claim 1 further comprising electrical leads coupled to the cylindrical electrical coil to apply an oscillating current to the cylindrical electrical coil.

6. The linear magnetic actuator of claim 1 wherein the rigid ferromagnetic housing has a cylindrical shape.

7. The linear magnetic actuator of claim 4 wherein the diameter of the rigid ferromagnetic housing is between 3 and 5 inches.

8. An underwater acoustic source, the acoustic source comprising:
   a first piston coupled to a second piston; and
   a plurality of linear magnetic actuators directly connected to each of the first piston and the second piston, each of the plurality of linear magnetic actuators comprising:
      a rigid ferromagnetic housing, having a first end and a second end,
      a cylindrical electrical coil mounted to an inside of the rigid ferromagnetic housing such that the cylindrical electrical coil is stationary relative to the rigid ferromagnetic housing,
      a cylindrical magnet assembly positioned adjacent to the cylindrical electrical coil, the magnet assembly comprising:
         a magnet shaft having a center longitudinal axis, and
         at least one cylindrical magnet having a center longitudinal axis that is aligned with the center longitudinal axis of the magnet shaft, the at least one cylindrical magnet having an outer diameter that is smaller than an inner diameter of the cylindrical electric coil,
      a linear shaft positioned within the cylindrical magnetic assembly and mounted to the first end of the rigid ferromagnetic housing and the second end of the rigid ferromagnetic housing, such that the linear shaft is stationary, and
      linear bearings positioned between the cylindrical magnet assembly and the linear shaft to allow the cylindrical magnet assembly to translate along the linear shaft relative to the cylindrical electrical coil, and
   wherein each of the plurality of linear magnetic actuators is activated, the first piston and the second piston oscillate towards and away from each other, causing acoustic waves to be generated in water.

\* \* \* \* \*